(12) United States Patent
Bongiorno et al.

(10) Patent No.: US 7,676,427 B1
(45) Date of Patent: Mar. 9, 2010

(54) SYSTEM AND METHOD OF CONTINUOUS ASSURANCE

(75) Inventors: Benedetto Bongiorno, Richardson, TX (US); Patti Lynn Bongiorno, Richardson, TX (US)

(73) Assignee: Natural Decision Systems, Inc., Richardson, TX (US)

( * ) Notice: Subject to any disclaimer, the term of this patent is extended or adjusted under 35 U.S.C. 154(b) by 1084 days.

(21) Appl. No.: 10/962,919

(22) Filed: Oct. 12, 2004

(51) Int. Cl.
*G06Q 40/00* (2006.01)

(52) U.S. Cl. .............................. 705/38; 705/35; 705/36; 705/37; 705/39

(58) Field of Classification Search ....................... None
See application file for complete search history.

(56) References Cited

U.S. PATENT DOCUMENTS

| | | | |
|---|---|---|---|
| 5,666,524 | A | 9/1997 | Kunkel et al. |
| 6,311,166 | B1 | 10/2001 | Nado et al. |
| 7,139,723 | B2 | 11/2006 | Conkwright et al. |
| 7,146,329 | B2 | 12/2006 | Conkwright et al. |
| 7,188,169 | B2 * | 3/2007 | Buus et al. .................. 709/224 |
| 7,197,472 | B2 | 3/2007 | Conkwright et al. |
| 7,236,941 | B2 | 6/2007 | Conkwright et al. |
| 7,302,419 | B2 | 11/2007 | Conkwright et al. |
| 2002/0038217 | A1 | 3/2002 | Young |
| 2003/0055759 | A1 | 3/2003 | Conkwright et al. |
| 2003/0110109 | A1 | 6/2003 | Conkwright et al. |
| 2004/0068431 | A1 * | 4/2004 | Smith et al. .................. 705/10 |
| 2004/0260582 | A1 * | 12/2004 | King et al. ..................... 705/7 |

OTHER PUBLICATIONS

Natural Decision Systems, Inc. presents Real Estate Advisor Series, Master View, Analytical Software for Real Estate Professionals, Manual for Version 3.04 (145 pp).

* cited by examiner

*Primary Examiner*—Kambiz Abdi
*Assistant Examiner*—Benjamin S Fields
(74) *Attorney, Agent, or Firm*—Winstead PC

(57) ABSTRACT

A computer system for conducting continuous assurance of financial documents is disclosed. The computer system comprises a processor, a bus coupled to the processor, a memory coupled to the bus, a mass storage system coupled to the bus, a communication device coupled to the bus, and continuous assurance software resident in the memory. The continuous assurance software, when executed, performing the steps of accessing client database at a predetermined interval, downloading total population from client database, performing analysis, evaluating analysis results, comparing total population to financial statements, determining a risk rating for each predetermined group, determining a materiality of anomalies, and displaying results.

4 Claims, 8 Drawing Sheets

SYSTEM AND METHOD OF CONTINUOUS ASSURANCE

CROSS-REFERENCE TO RELATED APPLICATIONS

Not Applicable.

STATEMENT REGARDING FEDERALLY SPONSORED RESEARCH/DEVELOPMENT

Not Applicable.

TECHNICAL FIELD OF THE INVENTION

This invention generally relates to a method for continuous monitoring and testing of all financial data throughout a specified reporting period and more specifically relates to an independent professional audit methodology for continuous monitoring and testing of financial data throughout a specified accounting reporting period in support of the independent auditor's opinion or financial statements taken as a whole or segments thereof.

BACKGROUND OF THE INVENTION

In today's highly competitive and complex corporate world, independent auditors must balance time and money spent insuring reporting accuracy with the need to provide to investors, managers, or government overseers, quality and control information for the financial transaction being audited. To accomplish this necessary quality and control, many accounting firms perform intermittent audits of selected records to ensure the substantial accuracy of the data presented on behalf of the company. In many cases, independent auditors perform year end audits after the period being audited has ended.

Based upon the entity's specific industry being audited, risk factors are identified. The independent auditor randomly identifies a sample set of records based upon the total population of records to be audited. The records are analyzed to determine the attributes of the total population of the database, which can then be examined with regard to the risk factors. For example, for an auditor that is auditing a Real Estate entity or section of an entity, a sample set of records is pulled regarding specific notes receivable amounts. The on-line or electronic value for the sample notes receivable are recomputed and/or are computed through the term of the note, thus simulating the remaining value of the note. The hard copy (paper copy) is then pulled and compared to the simulated data. A comparison is performed to determine the accuracy of the data with regard to the actual hard copy files. Further, a sampling of notes receivable in default over a specified term frame can be analyzed in a similar fashion. Once the entire sample has been analyzed, a statistical analysis of the findings from this series of samples results can be performed and the results are then applied across the total population of records to determine the projected number of errors, risks associated with the records, and materiality of such risks.

This approach to auditing began once the number of transactions for corporations exceeded an amount capable of realistic evaluation in an efficient time. With the advancement of computers, the ability to perform auditing through a statistical sampling of the records has increased in efficiency; however, the general premise of auditing samples has continued.

In U.S. Pat. No. 6,311,166 entitled "Method for Analyzing Effectiveness of Internal Controls in a Model of an Accounting System," dated Oct. 30, 2001 and issued to Robert A. Nado et al., a method for providing for assessment of control is disclosed. A method is provided for assessing control risks in a model based reasoning system used for analyzing financial accounting systems by decomposing and quantifying the risk factors in the model so that the risk factors can be used to determine areas in the accounting system for sufficient controls lacking and to determine which controls are key and thus, should be subject to detailed testing. Factors quantified are failure impact risk, failure coverage risk, allowable risk, control detection risk, control strength, control defeat factor, attenuation factor, and control contribution. The present invention is used to enhance a hierarchical flow chart generating system, such as the Comet system, by providing risk analysis operative on a particular class of hierarchical structured flow charts. (Abstract) However, this method is another variation of a sampling analysis.

In U.S. Pat. No. 5,666,524 entitled "Parallel Processing Systems for Traversing a Transactional Database," issued on Sep. 9, 1997 to Douglas F. Kunkel et al., a method of traversing a large database based upon user defined criteria computing information from the database based upon user defined criteria and providing information in the user specified format is disclosed. This invention discloses a parallel processing system provided which traverses logical records of events or transactional database contained in two or more physical files in accordance with one or more viewed definitions specified by the user. Each view definition includes a set of processing parameters and may reference one or more of the physical files. While one or more view definitions are transformed into entries of a logic table, the logic table including a plurality of sets, each set corresponding to a respective physical file and containing entries corresponding to the view definitions which reference its respective physical file. Each set of the logic table is transformed into machine code instructions from a separate thread of the parallel processing system. Each thread operates on its respective physical file and parallel with one or more of the other threads to traverse the physical file to retrieve information based on the view definition corresponding to the thread and stored the retrieved information and extract files designated by the view definition and performs design by the view definitions. (Abstract)

Neither of these patents address the need for a more complete monitoring and testing of transactions throughout a designated period. Therefore, any improvement in the ability to provide continuous assurance of the transaction records of a corporation without incurring excessive expense would be greatly beneficial.

SUMMARY OF THE INVENTION

A computer system for conducting continuous assurance of financial documents is disclosed. The computer system comprises a processor, a bus coupled to the processor, a memory coupled to the bus, a mass storage system coupled to the bus, a communication device coupled to the bus, and continuous assurance software resident in the memory. The continuous assurance software, when executed, performing the steps of accessing client database at a predetermined interval, downloading total population from client database, performing analysis, evaluating analysis results, comparing total population to financial statements, determining a risk rating for each predetermined group, determining a materiality of anomalies, and displaying results.

BRIEF DESCRIPTION OF THE FIGURES

For a more complete understanding of the present invention, including its features and advantages, reference is now made to the detailed description of the invention taken in conjunction with the accompanying drawing in which.

DETAILED DESCRIPTION OF THE INVENTION

While the making and using of various embodiments of the present invention are discussed in detail below, it should be appreciated that the present invention provides many applicable inventive concepts that may be embodied in a wide variety of specific contexts. The specific embodiments discussed herein are merely illustrative of specific ways to make and use the invention and do not delimit the scope of the invention.

Figure 1:
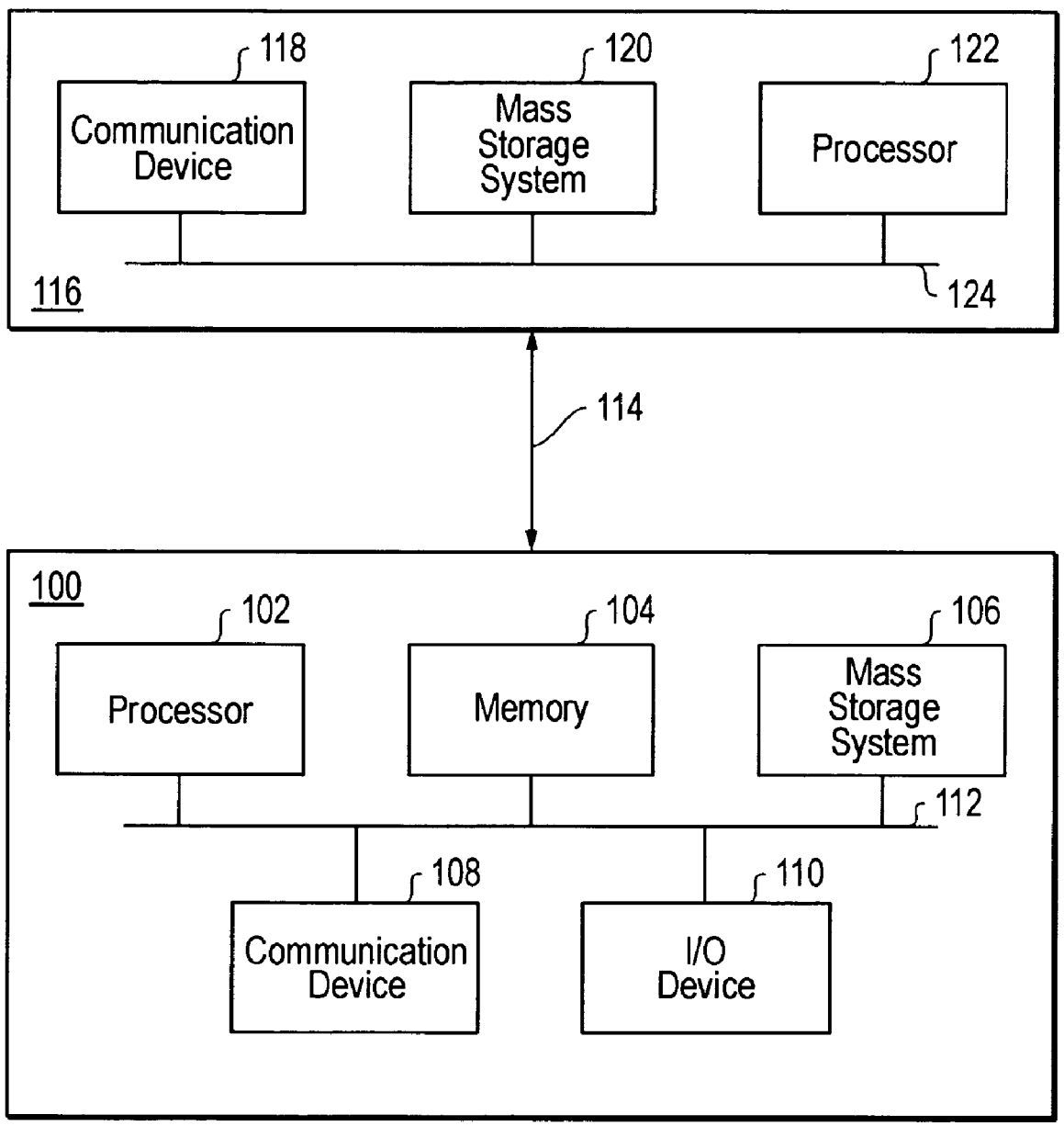
FIG. 1 is a block diagram of the computer system according to the present invention interfacing with a client computer system.

Referring now to FIG. 1, a computer system for performing continuous assurance is shown. A computer system 100 is provided, including a processor 102, which is coupled to a bus 112. The computer system 100 is of the kind typically known to those skilled in the art and include network computer systems for multiple users or include single desktop computer systems available to single users. A memory 104 is attached to the bus 112 and is accessible by the processor 102. A mass storage system 106, a communication device 108, and an I/O device 110 are attached to the bus 112 and are in communication with the other elements of the computer system 100. The mass storage system 106 includes resident continuous assurance software (not shown). This resident continuous assurance software is transferred to the memory 104 for execution by the processor 102. The I/O device 110 includes a mouse, a keyboard, or other commonly known data entry devices which can be implemented to communicate directly with the computer system 100. The communication device 108 is of the type commonly known to those skilled in the art and allows for communication with other computer systems, including, but not limited to, modems. The computer system 100 is connected to a computer system 116 via communication line 114. The communication line 114 is of the type commonly known to those skilled in the art and includes direct lines, access via the internet, access via a wireless connection, and other technologies which allow for the interconnection of multiple computer systems over vast distances.

The client computer system 116 includes a communication device 118, a mass storage system 120, and a processor 122, all coupled via bus 124. The client computer system 116 includes a plurality of records (not shown) stored in the mass storage system 120. This plurality of records stored in the mass storage system 120 include the total population of information regarding a particular category of financial information. A variety of categories may be included within the mass storage system 120 or the mass storage system 120 may include an extensive database wherein such financial category information may be obtained through parsing of the database. The client computer system 116 communicates to the computer system 100 through communication device 118 via communication line 114.

Figure 2:
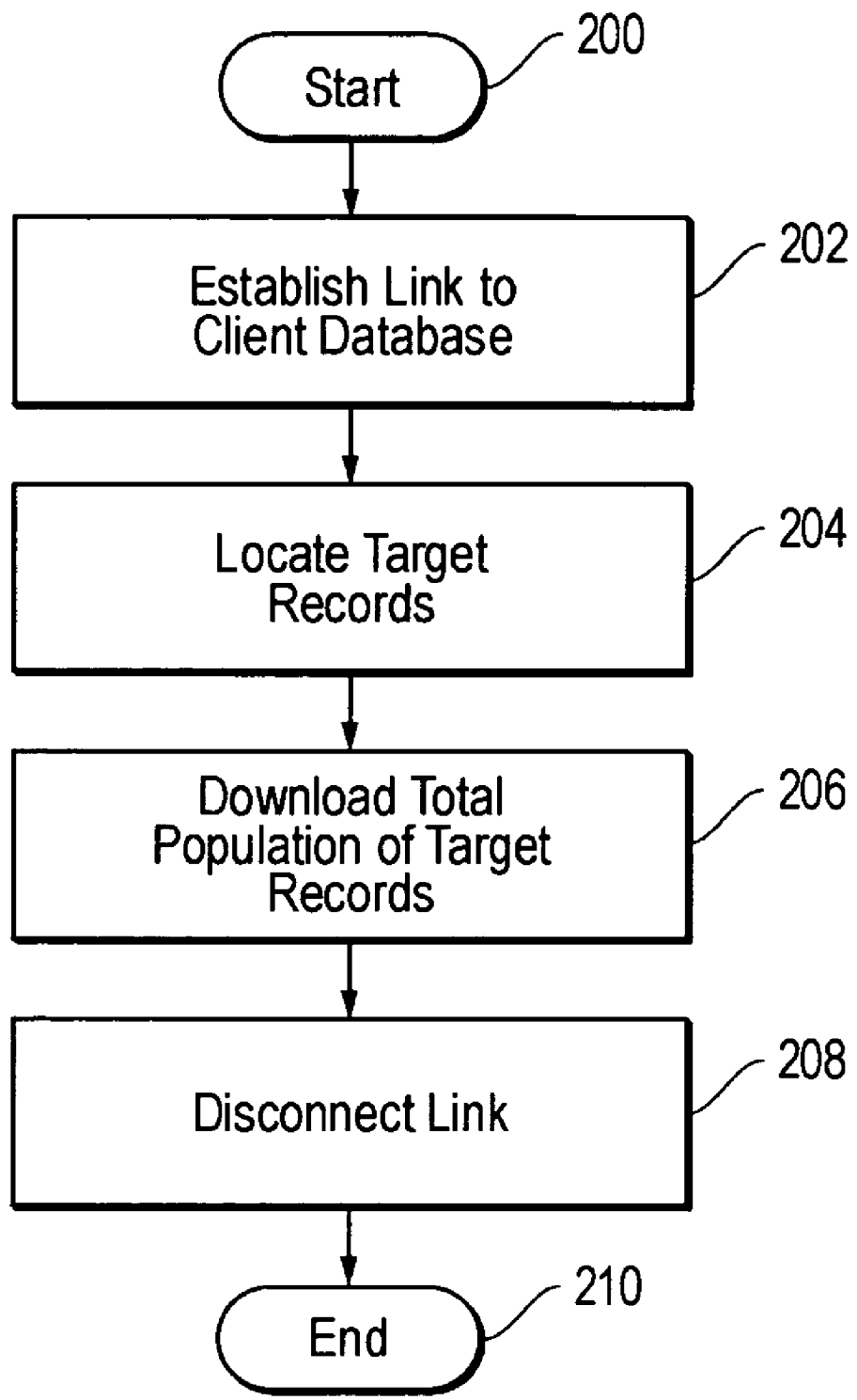
FIG. 2 is a flow diagram depicting the link establishment between the client database and the continuous assurance computer system according to the present invention.

Referring now to FIG. 2, a flow diagram depicting the link establishment method is shown. The process begins with Start 200. Next, in Step 202, a link is established between the client computer system and the continuous assurance computer system. The link may be established over a variety of communication links 114. In one disclosed embodiment, the client computer system and the specific database is accessed via a secure communication link such as a direct line connecting the client computer system 116 with the continuous assurance computer system 100. Such a secure communication link may be implemented with a dedicated auditing computer system either on-site, linked by TCP/IP, accessible through an Internet connection from either an on-site or offsite location, or accessible through a dedicated telephone line from an offsite location. To further enhance the security of such a system, access by the continuous assurance computer system may be as a read-only user, thus not allowing the continuous assurance computer system user to modify the data included within the client database. In another disclosed embodiment, the established link is created via an internet connection between the client computer system 116 and the continuous assurance computer system 100. In such embodiment, the continuous assurance computer system user would access the client computer system and have access to download the financial data to whatever computer system the continuous assurance computer system user is currently operating. Such internet connection can be accomplished with a remote communication device such as a standard modem or a wireless modem. Security precautions regarding the client computer system's financial records will be implemented through the use of specified user logins and passwords. This establishment link may be established at intermittent intervals or may be established at predetermined intervals such as yearly, quarterly or monthly. Further, such established link may be obtained continuously or on a daily or hourly basis to allow for real time access to the information contained in the client database.

Next, in Step 204, the target records are located. Based upon a set of criteria which is predetermined or selected by the continuous assurance computer system user, a specific category of records is identified. These records include specific transactions and are located in database files, tables or other commonly known schemes. In one disclosed embodiment, the continuous assurance computer system user views the descriptions of all the tables available and makes selections from these available tables. Such selection may include tables that are the primary or original source of data or historical data. Certain other tables may not be selected, such as interim reporting tables or internally computed tables.

From these specifically identified records, the total population of data for that category is located. Once these target records have been located, the total population of the data of the identified category or identified transactions are copied and transmitted to the continuous assurance computer system 100. The target records may include all records for the identified category, a subset of the records, or may be limited to a predetermined timeframe or interval such as a fiscal year. Once the total population of target files has been downloaded to the continuous assurance computer system in Step 206, the established link is disconnected in Step 208 and the process ends with Step 210.

Figure 3:
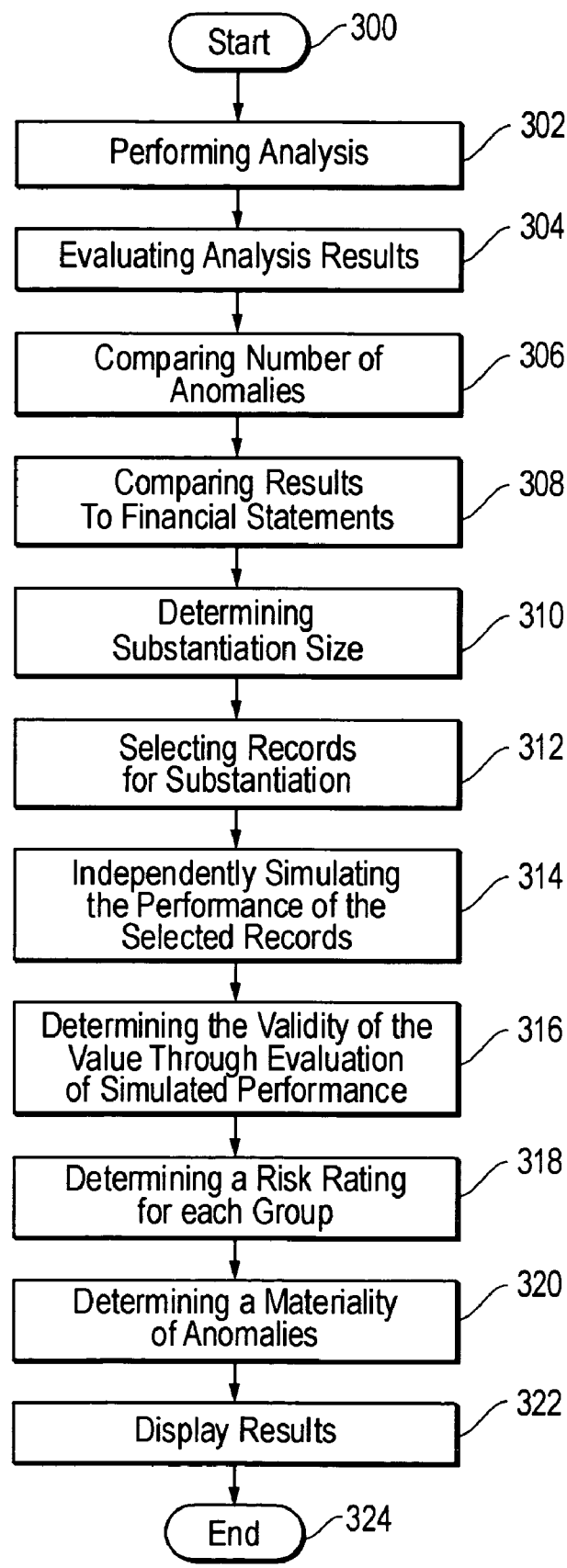
FIG. 3 is a flow diagram depicting the continuous assurance method according to the present invention.
Figure 4A:
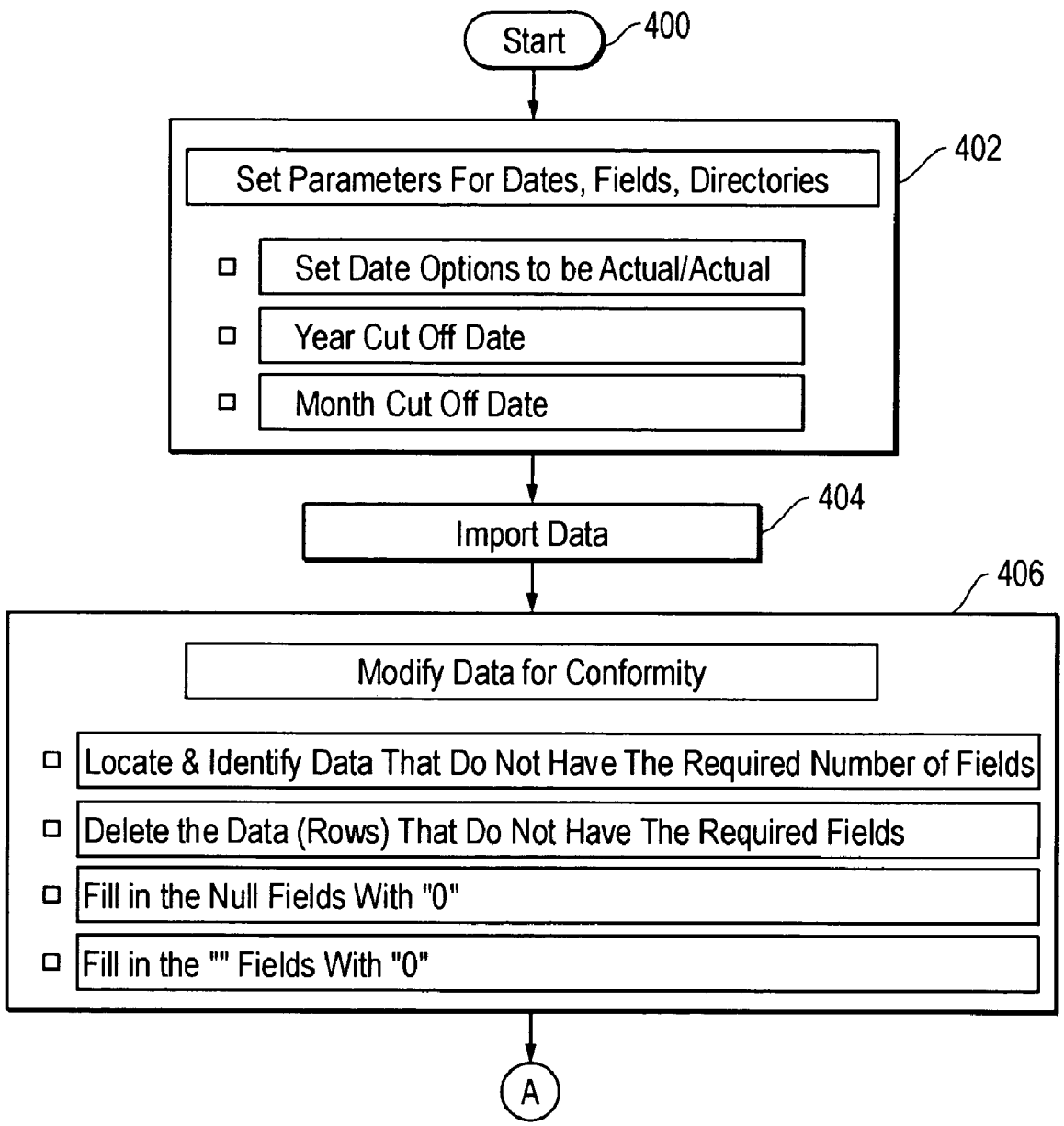
FIGS. 4A-4E are flow diagrams depicting one exemplary embodiment of the continuous assurance method disclosing the analysis of General Ledger according to the present invention.
Figure 4B:
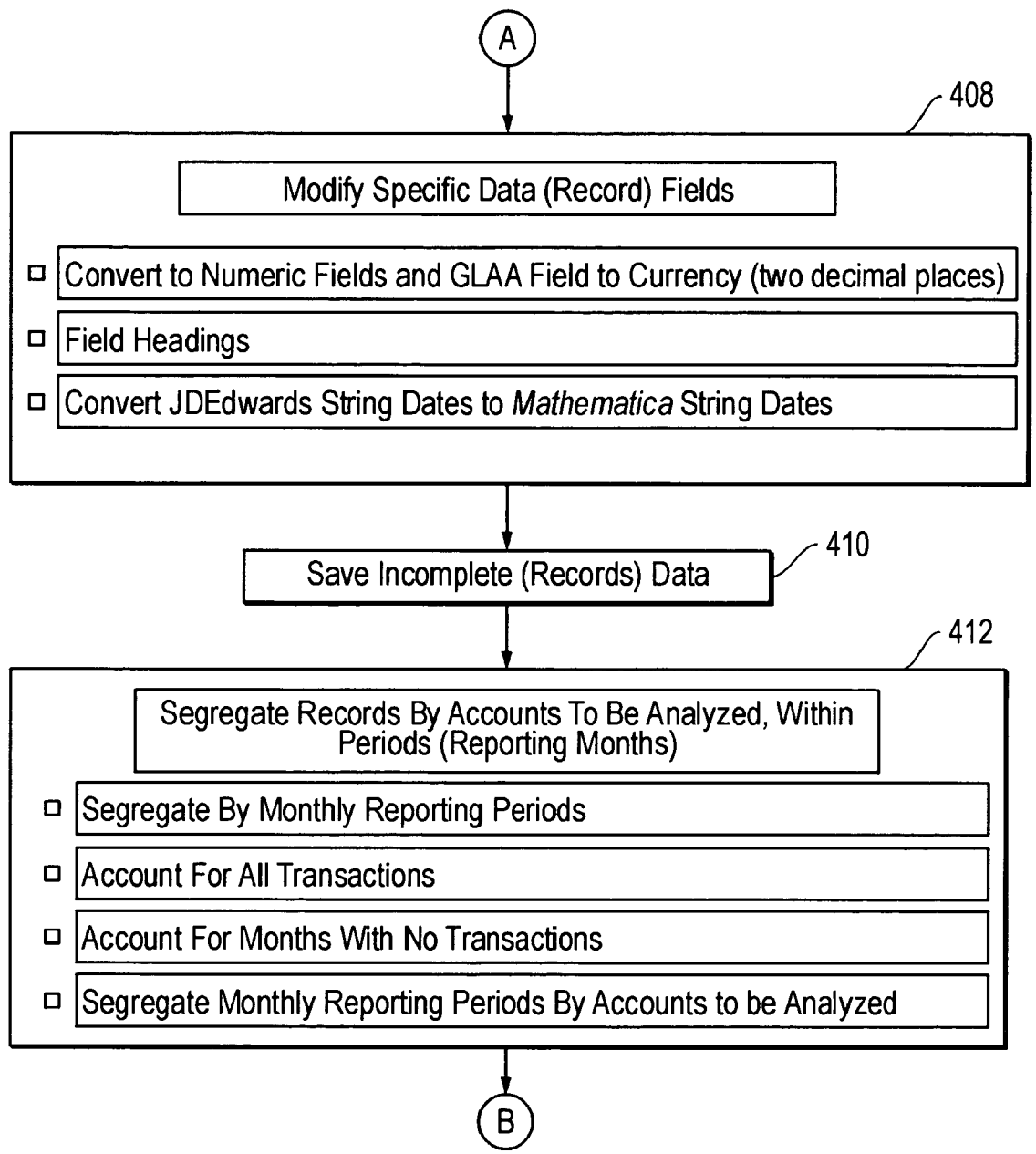
Figure 4C:
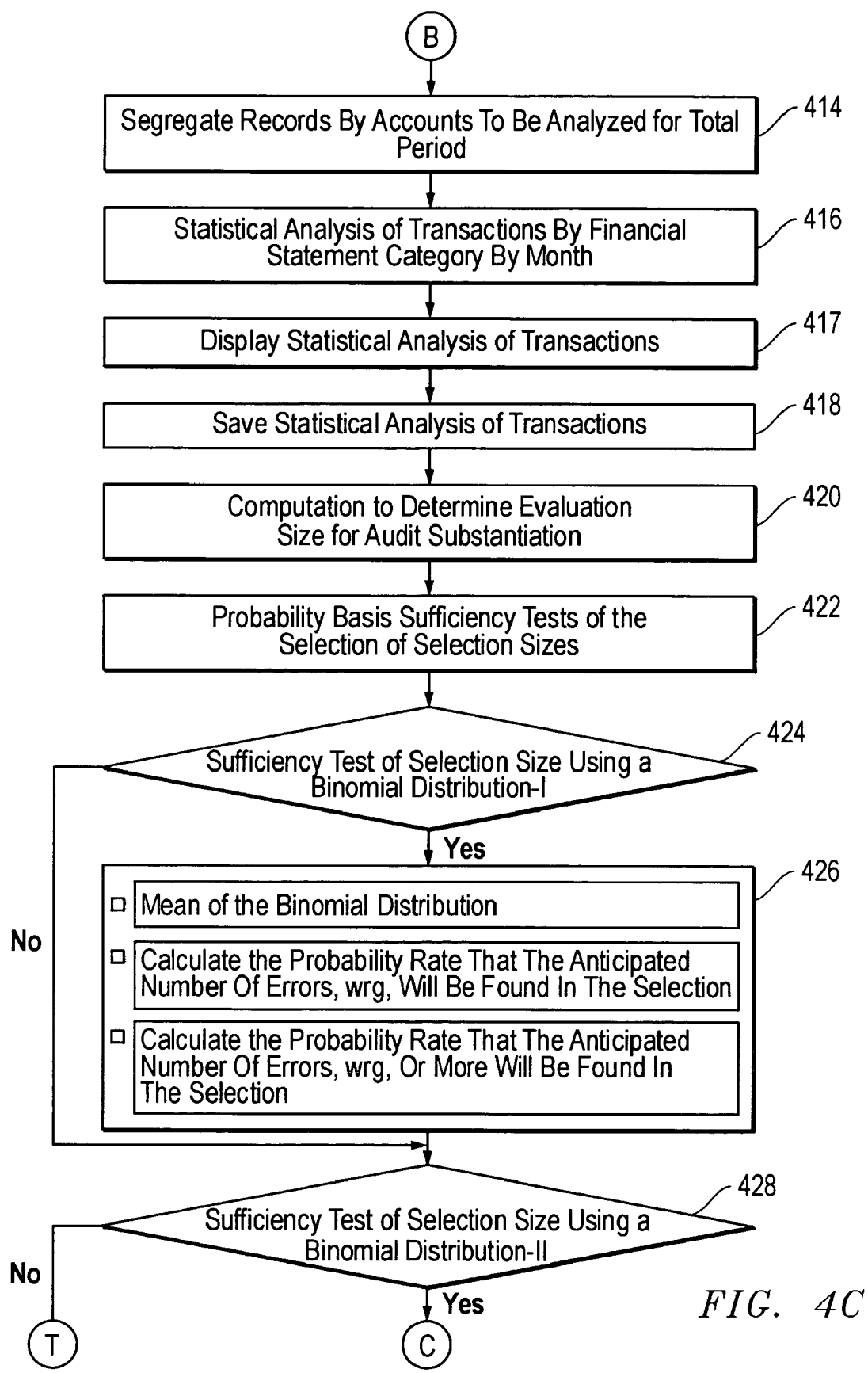
Figure 4D:
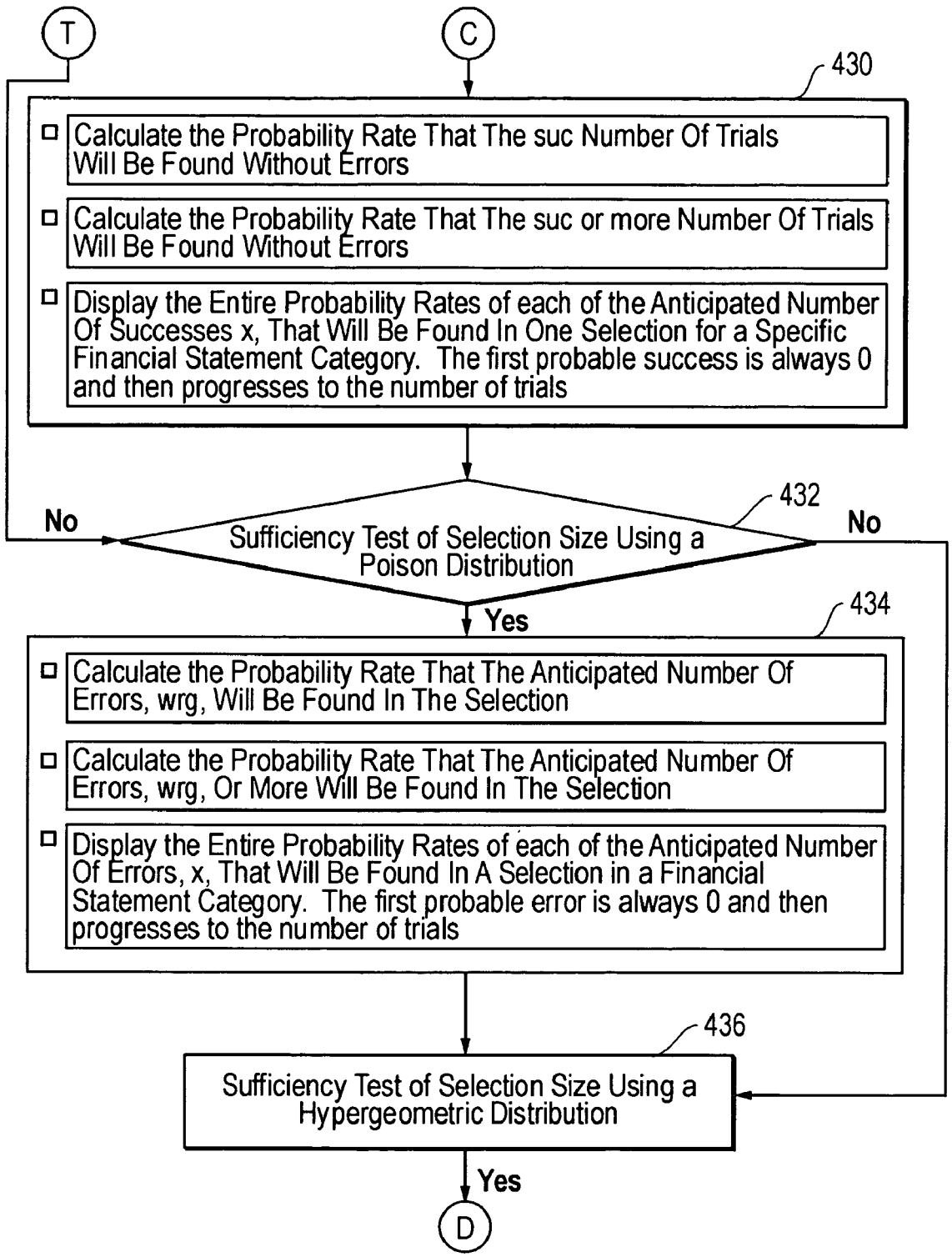
Figure 4E:
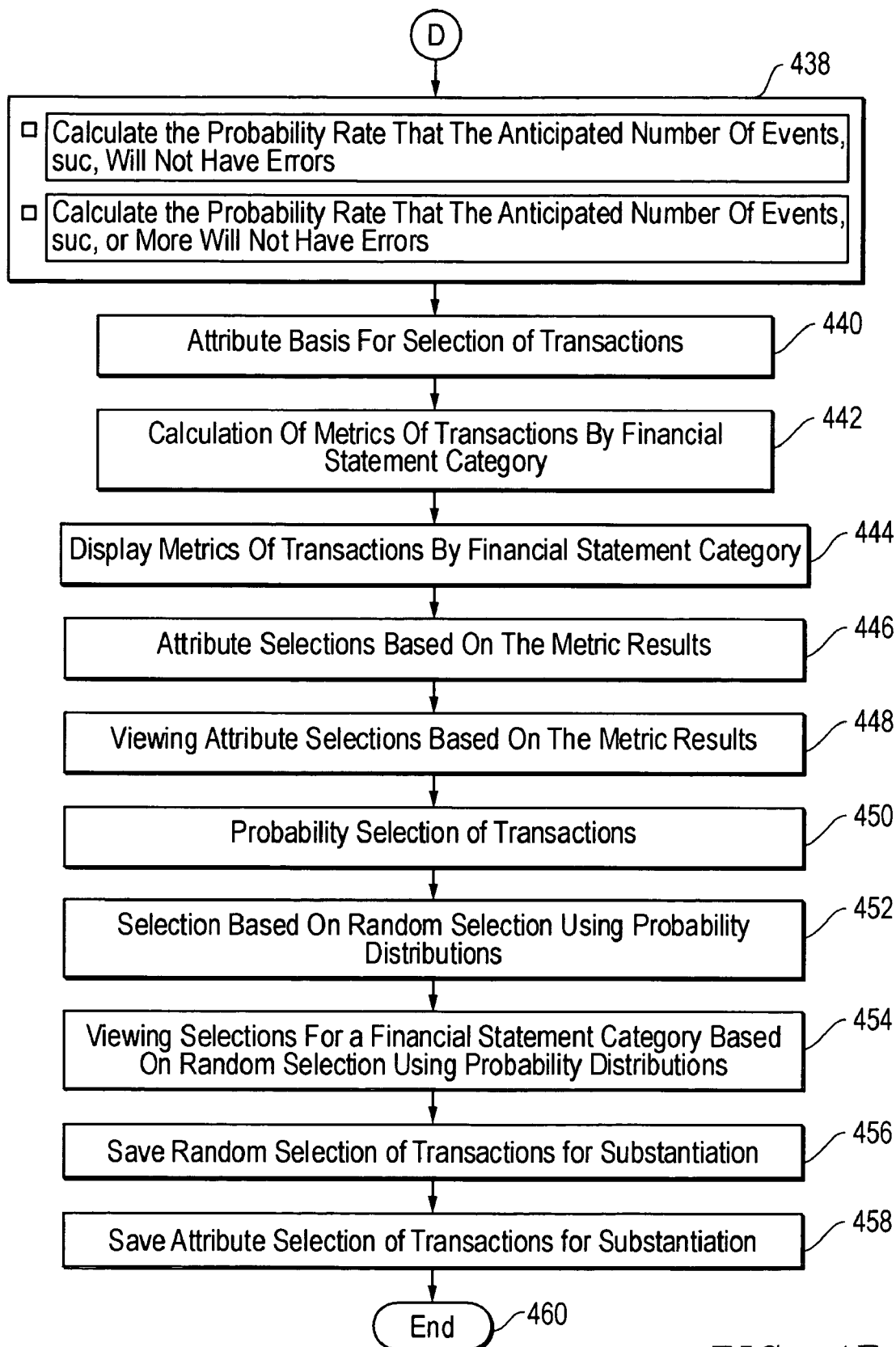

Referring now to FIG. 3, a flow diagram depicting the continuous assurance method according to the present invention are shown. The process begins with Start 300. Next, in Step 302, analysis is performed on the downloaded total population of the target files. The analysis includes, but is not limited to, statistical analysis, testing of the data, and simulation of the data. Unlike the prior art auditing methodology identified herein, this statistical analysis is performed on the total population of data, records or transactions, not just a statistical sampling of the transactions. To ensure accurate statistical analysis, the downloaded total population of records is modified to allow for consistent data format and to provide values in incomplete and inconsistent data fields. For example, date entries may be modified to a predetermined date standard such as dd/mm/yy and alphanumeric strings may be modified to numeric data fields. Financial transactions which contain incomplete information are identified and any missing information is modified by the entry of null values in those specific fields.

In one embodiment, the total population of records of a particular financial transaction type are analyzed. Specific financial transaction types of records include, but are not limited to, cash disbursements, cash receipts, payables, journal entries, sales, and costs incurred.

The analysis includes, but is not limited to, performing blind statistical analysis and analysis to determine anomalies in the total population. In one disclosed embodiment, the analysis is performed based upon the American Institute of Certified Public Accountants Generally Accepted Auditing Standards and the Public Company Accounting Oversight Board Auditing Standards. The analysis performed on the total population are those known to those skilled in the art or are identified in the auditing standards referenced above and include, but are not limited to, basic statistical methods such as standard deviation and mean. The analysis performed on the total population include but are not limited to those typically performed by auditors who are using the sampling methodology disclosed herein.

Next, in Step 304, the analysis results are evaluated. The analysis results are evaluated based upon generally accepted auditing standards and include, but are not limited to, a determination of the statistical anomalies in the total population. The number of anomalies are compared in Step 306. A predetermined risk level is compared to the number of anomalies to measure the audit risk wherein the predetermined risk level is selected by the continuous assurance computer system user. Such auditing risk includes inherent risk and control risk. The number of anomalies is also compared to a predetermined materiality level based upon an audit materiality. In determining the statistical anomalies, the number of transactions that lie outside of a standard bell curve distribution may also be identified. Next, in Step 308, the total population analysis results are compared to the financial statements. Through the analysis of the total population, the accuracy of the reported financial statements is obtained. Next, in Step 310, the substantiation size is determined. A manual substantiation size may be based upon the number of anomalies identified when the statistical anomalies are determined and compared with a predetermined materiality threshold selected by the continuous assurance computer system user. The substantiation size may include selection based upon the distribution probabilities.

Once the substantiation size has been obtained, the records are selected for evaluation in Step 312. These records may be selected randomly and include the manual inspection of the original documentation supporting the records or of the database records. In another disclosed embodiment the records may be selected for an electronic evaluation of the database records and may further include an independent simulation of the performance of the selected records wherein the selected records include all the current contractual terms in Step 314. In Step 316, the validity of the values obtained are determined by evaluating this simulated performance and may include the simulation of notes receivable, the simulation to real estate contracts, the simulation of mortgage debts, and the simulation of real estate intangibles. The simulated performance or projection is performed over a predetermined time period or over the length of the transaction. The continuous assurance computer system user may take a specific note and independently simulate the term of this note so that each transaction associated with this note is simulated and is compared to the financial statement category to determine the accuracy of the financial statements which are based upon the accuracy of the electronic data. Examples of specific analyses to be performed include a cash stream analysis based on the maturity of existing contracts; determining a risk associated with each and every transaction; determining a generating source of revenue; comparison of sales to receivables; and identification of key indicators to predict future revenues. These analyses are known to those skilled in the art and are therefore not discussed in detail herein.

Next, in Step 318, the risk rating for each group identified in the comparison to the financial statements is determined. The materiality of anomalies is determined in Step 320. The continuous assurance computer system user has set a predetermined materiality level to determine the materiality of anomalies identified in the total population. The predetermined materiality level may include variations in the specific amount and, for example, the level may be set at a value greater than the threshold amount such as $10,000. The results of all analyses are displayed in Step 322 and the process ends in Step 324. The displayed results include, but are not limited to, displaying the varying statistical analysis of the total population, as it relates to the financial statements; displaying the records which were selected for substantiation; displaying the assigned risk rating for each predetermined group based upon comparison of the total population to the financial statements; and displaying financial, asset or note performance.

Referring now to FIGS. 4A-4E, the analysis of general ledger based upon the present invention is disclosed. The process begins with Step 400. Next, in Step 402, the parameters are identified. The parameters are identified by the continuous assurance computer system user and are implemented throughout the period under audit and are used to assist with the extraction of the total population from the client computer system.

Next, in Step 404, the total population data is imported from the client computer system to the continuous assurance computer system. Once the data has been imported to the continuous assurance computer system, the data is modified for conformity in Step 406. The modification of data includes locating and identifying data that does not have the required number of fields per record, deleting data rows that do not have the required number of fields or include incomplete data, filling in all null fields with zeros and filling in all empty fields with zeros.

Next, in Step 408, specific data fields are modified. Alphanumeric fields are converted to numeric fields and numeric fields are converted to currency fields. Identifying field headings are added to the specific modified data fields and dates are converted to a consistent data string field such as mm/dd/yy.

Next, in Step 410, data records which contain incomplete data are saved. These data records include records that do not have the correct number of fields. In Step 412, the records are segregated by Accounts to be analyzed within the reporting periods. Such segregation is separated by monthly reporting periods, account for all transactions, account and months with no transactions, and monthly reporting periods by Accounts to be analyzed. The Accounts to be analyzed include, but are not limited to, Accounts Payable, Unearned Revenue, Deferred Income Taxes, Notes Payable, Subordinated Notes Payable, Common Stock, Additional Paid In Capital, Retained Earnings, and Treasury Stock. Next, in Step 414, the records are segregated by Account categories to be analyzed for the total period. Thus the records are separated only by the account categories and all records associated with specific account categories to be analyzed are provided for the total period selected in Step 402. In Step 416, a statistical analysis of the transactions by financial statement category by month is performed. During this analysis, months that are not applicable are removed from the analysis. The transactions analyzed include both debt and credit transactions.

Next, in Step 417, the statistical analysis of these transactions is displayed. The analysis of transactions may be displayed for the total period selected or may be displayed by month. In Step 418 the statistical analysis of transactions is saved. Next, in Step 420, computation to determine evaluation size for audit substantiation is provided. This step determines the size of an evaluation set which is based on the probability of the existence of a materiality threshold of error or misstatement. Two levels of determining the error rate threshold are: value error-threshold value of error based on the total value of the population; and unit error-value error divided by trimmed mean value of total population. This is the number of single errors that will equal the threshold value of error based on the total value of population. In determining the computation to determine the evaluation size for audit substantiation, a computation as to attributes and assurance materiality levels, of unit selection size based on dollar value materiality levels, the number of unit errors threshold within the selection set for the dollar value materiality level, the number of unit error threshold and the population for dollar value materiality level, the number of unit successes threshold in the selection for dollar value materiality level, and the number of unit successes percent threshold in the population for dollar value materiality level are determined.

Next, in Step 422, the probability basis sufficiency tests of the selection of evaluation sizes are made. The probability basis sufficiency test is based upon the dollar materiality levels of total value of the population and total number of individual debits and credits for audit substantiation and based upon dollar materiality levels of total value of population and total number of control units for debits and credits for audit substantiation. Next, in Step 424, the sufficiency test of selection size using a binomial distribution-1 methodology is made. In Step 426 the binomial distribution, which is a discreet probability distribution, and is a finite number of independent Bernoulli trials, is used. Bernoulli distribution results in the probability of two outcomes: Success equals "1" or failure equals "0".

$$P(x) = \pi^{\hat{}} x * (1-\pi)^{\hat{}}(n-x)$$

The mean of the binomial distribution is determined and the probability rate that the anticipated number of materiality threshold errors will be found in the selection is calculated. Further, the probability rate that the anticipated number of materiality threshold errors or more will be found in the selection, is also calculated. If the binomial distribution-I is not selected, then a determination of whether a binomial distribution-II is selected is determined in Step 428. Then in Step 430, the probability rate that the number of trials (selections) will be found without errors is calculated, the probability rate that the number of successes or more than the number of successes of trials (selections) will be found without errors is calculated, and the entire probability rates of each of the anticipated number of successes that will be found in one selection for a specific financial statement category is displayed. The first probability of success is always "0" and then progresses to the number of trials. If the binomial distribution-II sufficiency test is not sufficient, then the Poisson distribution sufficiency test is used as determined in Step 432. If the Poisson distribution sufficiency test is used, then, in Step 434, the probability rate that the anticipated number of materiality threshold errors will be found in the selection is calculated, the probability rate that the anticipated number of materiality threshold errors or more will be found in the selection as calculated, and the entire probability rates of each of the anticipated number of anticipated errors that will be found in a selection in a financial statement category is displayed. If the Poisson sufficiency test is not used as determined in Step 432, then, in Step 436, a hypergeometric distribution sufficiency test is performed.

Next, in Step 438, the probability rate that the anticipated number of events will not have errors is calculated and the probability rate that the anticipated number of events or more, will not have errors is calculated. Next, in Step 440, the attribute basis for selection of transactions is determined. A wide variety of attributes can be used in the selection of transactions. Such attributes include the determination of outliers and anomalies of transactions by the financial statement category for audit substantiation, dollar value anomalies for debit transactions, dollar value anomalies for credit transactions, random probability distributions for debit transactions, random probability distributions for credit transactions, random probability distributions for control unit debit transactions, random probability distributions for control unit credit transactions, both anomalies and probability selections for debit and credit transactions, document control for debit and credit transactions, and specific documents listing control debit and credit transactions. In Step 442, the calculation of metrics of all transactions by financial statement category is determined. This calculation includes a replacement of any values equaling infinity with the number zero, the conversion of single vectors to matrix, and the calculation of frequency of dollar value transactions for the total current period.

Next, in Step 444, the metrics of all transactions by financial statement category are displayed. Next, in Step 446, the attribute selections based on the metric results is determined and the attribute selections based on the metric results are viewed in Step 448. Next, in Step 450, the probability selection of transactions are made. In Step 452, an additive selection is based upon random selection of the total population using the probability distributions size. The selections for a financial statement category based on random selection use and probability distributions are viewed in Step 454. The random selection of transactions for a substantiation are saved in Step 456 and the attribute selection of transactions for substantiation are saved in Step 458. The process ends with Step 460.

Although this invention has been described with reference to an illustrative embodiment, this description is not intended to limit the scope of the invention. Various modifications and combinations of the illustrative embodiments as well as other embodiments of the invention will be apparent to persons skilled in the art upon reference to the description. It is therefore intended that the appended claims accomplish any such modifications or embodiments.

What is claimed is:

1. A method comprising:
   (a) providing a processor;
   (b) providing a memory interoperably coupled to the processor and having computer software code stored thereon;
   (c) using the processor and the memory in combination to perform at least one of steps (d)-(m);
   (d) dividing a non-sampled total population of financial transactions into a plurality of financial-statement categories;
   (e) performing, on the non-sampled total population of financial transactions of each of the plurality of financial-statement categories, an analysis;
   (f) using at least one result of step (e), determining statistical anomalies of the non-sampled total population of financial transactions;
   (g) using at least one result of step (f):
     determining an audit-risk relative to a predetermined audit-risk level; and
     determining audit-materiality relative to a predetermined materiality level;
   (h) using at least one result of step (e), comparing each expected result of the analysis with corresponding data of the non-sampled total population in the plurality of financial-statement categories;
   (i) using at least one result of step (h), determining, based upon the number of statistical anomalies identified, probability models, and the determined materiality, for each of the plurality of financial-statement categories, a sample size to be taken from at least one of the plurality of financial-statement categories;
   (j) performing, for each of the plurality of financial-statement categories, a random statistical sampling in accordance with the sample size determined in step (i);
   (k) simulating each randomly-sampled-total-population financial transaction in the plurality of financial-statement categories;
   (l) using at least one result of step (k), comparing each result with records corresponding to the simulated financial transaction in the plurality of financial-statement categories; and
   (m) using at least one result of step (l):
     determining a risk rating of each category of the plurality of financial-statement categories; and
     determining the materiality of identified anomalies relative to a predetermined materiality level.

2. The method of claim 1, comprising accessing a client database responsive to a first predetermined interval of time having elapsed.

3. The method of claim 2, comprising downloading from the client database the non-sampled total population of financial transactions occurring during the predetermined interval of time.

4. The method of claim 1, wherein the analysis comprises:
   statistically analyzing the non-sampled total population;
   simulating each non-sampled-total-population financial transaction in the plurality of financial-statement categories; and
   testing the non-sampled total population data.

\* \* \* \* \*